No. 631,584. Patented Aug. 22, 1899.
A. J. RUDOLPH.
MACHINE FOR FORMING BOTTLE NECKS.
(Application filed Jan. 11, 1899.)
(No Model.) 2 Sheets—Sheet 1.
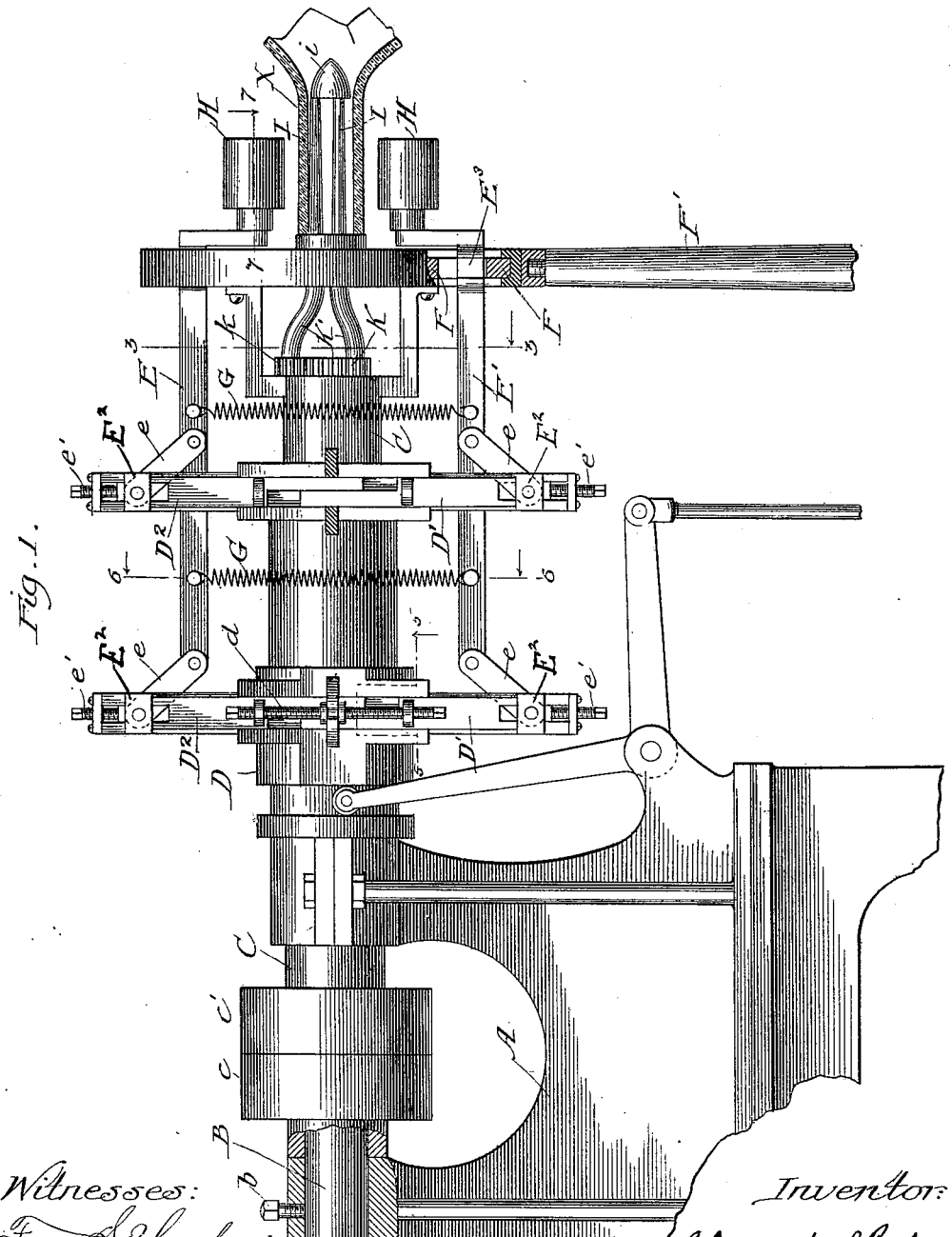

No. 631,584. Patented Aug. 22, 1899.
A. J. RUDOLPH.
MACHINE FOR FORMING BOTTLE NECKS.
(Application filed Jan. 11, 1899.)
(No Model.) 2 Sheets—Sheet 2.
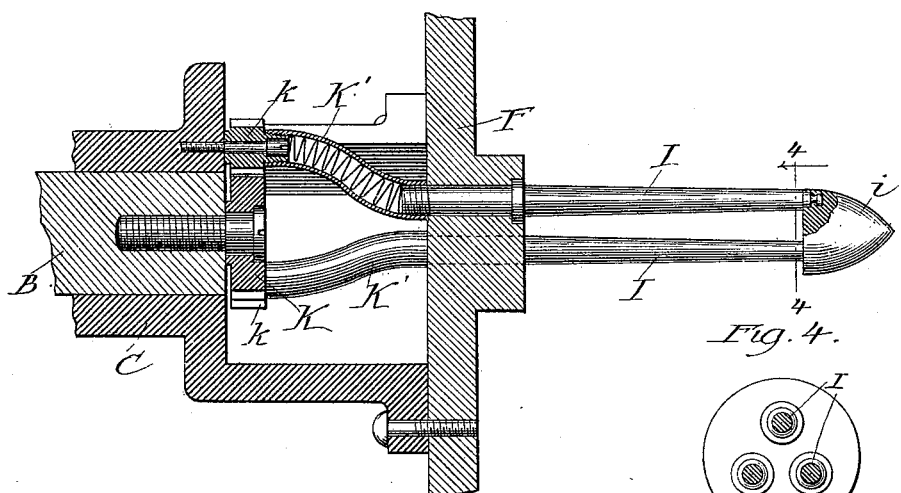
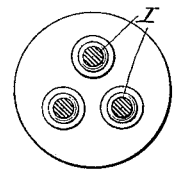
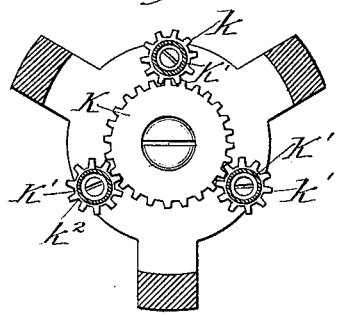
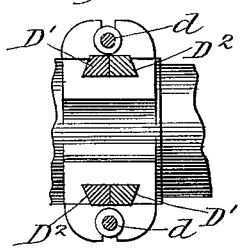
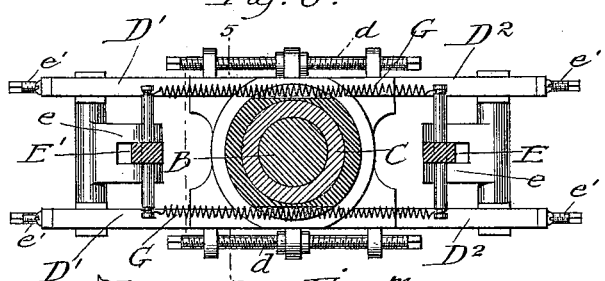
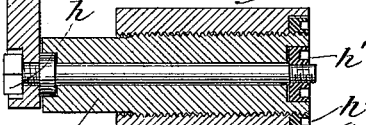
Witnesses: Frank S. Blanchard, Thomas C. McGregor
Inventor: Alexander J. Rudolph
By Attorneys Banning Barnum & Sheridan

UNITED STATES PATENT OFFICE.

ALEXANDER J. RUDOLPH, OF CHICAGO, ILLINOIS.

MACHINE FOR FORMING BOTTLE-NECKS.

SPECIFICATION forming part of Letters Patent No. 631,584, dated August 22, 1899.

Application filed January 11, 1899. Serial No. 701,832. (No model.)

*To all whom it may concern:*

Be it known that I, ALEXANDER J. RUDOLPH, a citizen of the United States, residing at Chicago, Illinois, have invented certain new and useful Improvements in Machines for Sizing and Forming Bottle-Necks, of which the following is a specification.

My invention relates to that class of machines in which there is combined mechanism arranged to act upon the neck of a bottle while in a heated ductile condition, size the same, and give unto it the desired shape.

The object of the invention is to provide a simple, economical, and efficient machine for sizing and forming bottle-necks; and the invention consists in the combinations, features, and details of construction hereinafter described and claimed.

In the accompanying drawings, Figure 1 is a side elevation of a machine constructed in accordance with my improvements; Fig. 2, a longitudinal sectional elevation of a portion of the machine, particularly the mechanism for sizing and shaping the interior surface of the bottle-neck; Fig. 3, a transverse sectional view of a portion of the mechanism shown in Fig. 1 and taken on line 3 thereof, looking in the direction of the arrow; Fig. 4, a transverse sectional view taken on line 4 of Fig. 2; Fig. 5, a sectional view taken on line 5 of Fig. 1; Fig. 6, a cross-sectional view taken on line 6 of Fig. 1, looking in the direction of the arrow; and Fig. 7, a longitudinal sectional view of one of the forming-rolls, taken through line 7 of Fig. 1.

In constructing a machine in accordance with my improvements I provide a head-stock A of the desired size, shape, and strength to hold the different parts in operative position. In this head-stock a non-rotatable or fixed shaft B is secured at one end by means of the set-screw $b$, and upon this non-rotatable shaft and in the head-stock is mounted a rotatable mandrel or spindle C, preferably made in the shape of a hollow sleeve, as clearly shown in the drawings. This rotatable mandrel is provided with the usual tight and loose pulleys $c$ and $c'$, which are used for the purpose of transmitting power and motion to the mandrel.

To size and shape the exterior surface of the bottle-neck, an operating-sleeve D is provided, which is slidingly mounted upon the rotatable mandrel and provided with transverse projections or lugs D' and D², slidingly fitted together and held in the desired position by means of the right and left handed screws $d$. By rotating the right and left handed screws, which act as a "turnbuckle," these projecting lugs are moved outwardly and inwardly for purposes which will more fully hereinafter appear.

Parallel movable bars E and E' are provided and connected with the projecting lugs by means of links $e$, which are pivotally connected therewith and with the sliding blocks E² by means of the set-screws $e'$. These sliding blocks are adjustably held in engagement with the projecting lugs. Each of the parallel bars is provided with slotted shoulders E³, mounted in slots in a disk F, which is rotatably mounted in a standard F', so that as the reciprocating sleeve is moved backwardly and forwardly the parallel bars are prevented from having any longitudinal movement, but by means of the links are moved inwardly and outwardly, while the helical springs G serve to keep the parallel bars at the inner limit of motion and at the same time prevent rattling. Each of these parallel bars is provided with forming-rolls H, which are rotatably mounted thereon so as to contact the outer surface of a bottle-neck X and size and shape the same. In Fig. 7 I have shown this forming-roll as made longitudinally adjustable—that is, the main portion H may be moved upon the inner portion H', so as to reduce or lengthen the distance between the ends or shoulders of both such parts, and thus reduce or lengthen the size of a bottle-lip. This inner part H' is held rotatable on the rod $h$ by means of the set-nut $h'$, while the outer part H is screw-threaded in engagement thereof and can be held in any desired position by means of the lock-nut $h^2$.

To size and shape the interior surface of the bottle-neck, two longitudinal rolls I and I are provided which have their outer bearings in a conical-shaped piece $i$ and their inner bearings in the disk F. To rotate these rolls I and I, which go to make up the forming-plug, the fixed or non-rotatable shaft B is provided with a toothed gear K, meshing with three spur-pinions $k$, $k'$, and $k^2$, which in turn are mounted upon the rotatable mandrel, so that as the rotatable mandrel revolves around the fixed shaft these small spur-pinions are given an accelerated rotation independent of the rotation of such mandrel. To transmit the rotation of these small or driven pinions to the rolls of the forming plug, flexible shafts K' are provided, as shown in Fig. 2, and connected to the driven pinions and to the inner ends of the forming-plug rolls.

I claim—

1. In a machine of the class described, the combination of a rotatable mandrel, an operating-sleeve slidingly mounted thereon, a parallel bar or bars adjustably secured to the operating-sleeve, and a forming-roll on each parallel bar, substantially as described.

2. In a machine of the class described, the combination of a rotatable mandrel, an operating-sleeve slidingly mounted thereon, transverse projecting lugs adjustably secured to the operating-sleeve, a parallel bar or bars, link mechanism secured to the parallel bars and adjustable transverse lugs, and forming-roll mechanism secured to the parallel bars, substantially as described.

3. In a machine of the class described, the combination of a rotatable mandrel, an operating-sleeve slidingly mounted thereon, transverse projecting lugs adjustably secured to the operating-sleeve, parallel bars carrying forming-roll mechanism, links pivotally secured to the parallel bars and adjustably secured to the adjustable transverse lugs, substantially as described.

4. In a machine of the class described, the combination of a rotatable mandrel, an operating-sleeve slidingly mounted thereon, transverse lugs adjustably secured to the operating-sleeve, right and left handed screws for adjustably holding the transverse lugs in position, parallel bars carrying forming-roll mechanism, a disk to prevent lateral movement thereof, link mechanism pivotally secured to the parallel moving bars and adjustably secured to the adjustable lugs, and spring mechanism to assist in holding the parallel bars at their inner limit of rotation, substantially as described.

5. In a machine of the class described, the combination of a rotatable mandrel, a fixed shaft therein, a forming-plug provided with one or more rotatable rolls, a gear secured to the fixed shaft, a spur-pinion pivotally secured to the rotatable mandrel for each roll of the forming-plug, and a flexible shaft for each roll of the forming-plug and secured thereto and to a driven pinion, whereby the rotations of the rotatable mandrel are used to rotate the rolls of the forming-plug, substantially as described.

6. In a machine of the class described, the combination of mechanism for forming the inner surface of a bottle-neck, and a roll or rolls for forming the exterior of a bottle-neck, each formed in two parts one part longitudinally and adjustably engaging the other, substantially as described.

ALEXANDER J. RUDOLPH.

Witnesses:
  THOMAS F. SHERIDAN,
  THOMAS B. McGREGOR.